(12) United States Patent
Hamann

(10) Patent No.: US 10,232,736 B2
(45) Date of Patent: Mar. 19, 2019

(54) DRIVETRAIN CONTROL FOR A MOTOR-ASSISTED VEHICLE

(71) Applicant: John R. Hamann, Tequesta, FL (US)

(72) Inventor: John R. Hamann, Tequesta, FL (US)

(73) Assignee: Velocomp LLC, Jupiter, FL (US)

( * ) Notice: Subject to any disclaimer, the term of this patent is extended or adjusted under 35 U.S.C. 154(b) by 8 days.

(21) Appl. No.: 15/685,284

(22) Filed: Aug. 24, 2017

(65) Prior Publication Data

US 2018/0056812 A1 Mar. 1, 2018

Related U.S. Application Data

(60) Provisional application No. 62/380,147, filed on Aug. 26, 2016.

(51) Int. Cl.
| | | |
|---|---|---|
| *B60L 15/20* | (2006.01) | |
| *B60W 10/08* | (2006.01) | |
| *B60W 10/10* | (2012.01) | |
| *B60W 30/18* | (2012.01) | |
| *B60W 40/068* | (2012.01) | |

(Continued)

(52) U.S. Cl.
CPC ............ *B60L 15/20* (2013.01); *B60L 11/007* (2013.01); *B60W 10/08* (2013.01); *B60W 10/10* (2013.01); *B60W 30/18009* (2013.01); *B60W 40/068* (2013.01); *B60W 50/12* (2013.01); *B60L 2200/10* (2013.01); *B60L 2200/12* (2013.01); *B60L 2240/12* (2013.01); *B60L 2240/421* (2013.01); *B60L 2240/486* (2013.01); *B60L 2240/622* (2013.01); *B60L 2240/642* (2013.01); *B60L 2240/647* (2013.01); *B60L 2240/66* (2013.01); *B60L 2250/18* (2013.01); *B60W 2300/36* (2013.01); *B60W 2400/00* (2013.01); *B60W 2550/12* (2013.01);

(Continued)

(58) Field of Classification Search
CPC .. B60L 15/20; B60L 11/007; B60L 2240/622; B60L 2240/642; B60L 2200/10; B60L 2250/18; B60L 2240/421; B60L 2240/12; B60L 2240/66; B60L 2200/12; B60L 2240/647; B60L 2240/486; B60W 10/08; B60W 40/068; B60W 30/18009; B60W 50/12; B60W 10/10; B60W 2550/147; B60W 2710/1005; B60W 2550/12; B60W 2400/00; B60W 2710/081; B60W 2300/36
USPC ............................................................ 701/22
See application file for complete search history.

(56) References Cited

U.S. PATENT DOCUMENTS

| | | | |
|---|---|---|---|
| 10,106,026 B2 * | 10/2018 | Biderman | ............... H04W 4/60 |
| 2013/0179016 A1 | 7/2013 | Gale | |

(Continued)

*Primary Examiner* — Muhammad Shafi
(74) *Attorney, Agent, or Firm* — GSS Law Group

(57) ABSTRACT

An apparatus for controlling an electric motor in a motor-assisted, pedaled or hand-cranked vehicle includes a processor adapted to calculate a value for the net opposing force acting on the vehicle; a vehicle speed sensor, an accelerometer to measure a component of vehicle acceleration in a direction of travel of the vehicle, an air pressure sensor measuring air pressure in the direction of travel, a sensor that measures the power output of the electric motor, and a power assist processor that calculates an amount of power to be supplied by an electric motor according to measured values for speed, acceleration, air pressure, and power provided by a person riding the vehicle.

15 Claims, 5 Drawing Sheets

(51) Int. Cl.
  *B60W 50/12*   (2012.01)
  *B60L 11/00*   (2006.01)
(52) U.S. Cl.
  CPC . *B60W 2550/147* (2013.01); *B60W 2710/081* (2013.01); *B60W 2710/1005* (2013.01)

(56) References Cited

U.S. PATENT DOCUMENTS

| | | |
|---|---|---|
| 2014/0230571 A1 | 8/2014 | Pape et al. |
| 2016/0014252 A1* | 1/2016 | Biderman .............. B60L 15/20 455/420 |
| 2016/0075177 A1* | 3/2016 | Biderman .............. B60L 3/003 301/6.5 |
| 2016/0075226 A1* | 3/2016 | Biderman .............. A61G 5/04 301/6.5 |
| 2016/0121730 A1 | 5/2016 | Fujita et al. |
| 2016/0243927 A1* | 8/2016 | Biderman ............ B60K 7/0007 |

* cited by examiner

DRIVETRAIN CONTROL FOR A MOTOR-ASSISTED VEHICLE

CROSS REFERENCE

This application claims priority to U.S. Provisional Patent Application No. 62/380,147 filed Aug. 26, 2016, titled "Drivetrain Control for a Motor-Assisted Vehicle", and incorporated herein by reference in its entirety.

BACKGROUND

A motor-assisted vehicle may combine power supplied by a person through the operation of levers, pedals, oars, or other movable parts of a power transmission apparatus with power supplied from an electric motor to propel the vehicle. Examples of motor-assisted vehicles include bicycles, tricycles, pedal cars, boats, aircraft, and other conveyances driven in part by an electric motor and in part by human muscle power. A motor controller in the vehicle may set operating parameters for the motor in response to a performance objective set by a person operating the vehicle. For example, a person pedaling a motor-assisted bicycle may direct the motor controller to maintain a constant forward velocity, perhaps a minimum forward velocity over hilly roads or against a headwind, a constant amount of applied pedaling power provided by the person, or another performance objective of the person's choosing. The motor controller may measure an amount of power provided by the person, calculate an amount of power to be provided by the electric motor to combine with power from the person for meeting the performance objective, and set an operating parameter for the motor to produce the calculated amount of motor power.

Power provided by a person to a vehicle in motion may be estimated from a measurement of torque exerted by the person on a movable part of the vehicle, for example bicycle pedals, or on a hand-bike, hand grips connected to rotating crank arms. The measured torque value may be combined with other measurements, for example cadence, to calculate a value of power provided to the vehicle by the person. Cadence refers to a number of revolutions of the crank arms per unit time. The motor controller may compare the value of power provided by the person with an estimate of power needed to meet the performance objective to determine how much power is to be provided by the electric motor. A setpoint value for an operating parameter for the motor may be selected to deliver the calculated amount of motor power. The motor controller may attempt to hold the operating parameter to the setpoint value in response to changes in a measured parameter related to the performance objective.

A motor controller attempting to hold a motor operating parameter to a constant setpoint value may over-react or under-react to a change in a measured value related to a performance objective. The motor controller may maintain a same setpoint value for motor operation even when environmental conditions affecting a vehicle change. For example, a motor controller may act to maintain a constant vehicle speed over a steep hill or against a sudden wind. A detected change in vehicle speed may cause the motor controller to supply more electric power to the electric motor, increasing current drawn from a battery coupled to the motor controller and possibly reducing an operating range for the vehicle.

Attempting to maintain a constant value for a setpoint related to a performance objective may lead to an unsafe operating condition. For example, when traveling on a smooth road at a set speed, if the vehicle then transitions to a rough road, the motor controller may attempt keep the vehicle speed at its fixed, smooth-road setpoint value of speed, even when the setpoint value may be unsafe for the rough road condition.

A delay in reacting to a change in a measured value related to a performance condition may cause other problems. For example, a delay in adapting electric power delivered to the electric motor, for example a delay in modifying motor power to compensate for measured torque on the crank arms, or failure of the motor control system to adapt to changing road conditions such as surface roughness, road surface slope, or changes in wind conditions, may cause a person pedaling a motor-assisted vehicle to apply uncomfortable or unsustainable amounts of power to the pedals, cause undesirable variations in vehicle speed, pedaling cadence, deplete the battery powering the motor before a desired destination is achieved, or cause other unwanted performance or safety effects.

Motor-assisted vehicles, for example motor-assisted bicycles and the like, may use a torque sensor on a crank arm or frame member of the vehicle to measure forces applied by a person riding the vehicle. For example, a torque sensor may employ a strain gauge to measure a deflection of the structure to which the sensor is attached. The deflection can be related to a force applied by the person, and the force related to a value of applied power by multiplying the force by cadence and possibly other factors. Torque sensors and strain gauges require complicated and expensive manufacturing and calibration procedures. Furthermore, torque sensors and strain gauges may be susceptible to changes in accuracy caused by temperature changes, repeated stress and wear on the sensor and associated mechanical components, damage to the sensor and associated wiring by impact or corrosion, exposure to chemicals, exposure to solar and thermal radiation, and other factors.

SUMMARY

An example apparatus embodiment includes: sensors; a processor in signal communication with the sensor, the processor configured to determine a value of a net force in opposition to a motion of a vehicle; and an output from the processor corresponding to a setpoint value for an operating parameter for an electric motor.

An example apparatus embodiment includes an opposing force processor adapted to calculate a value for a net opposing force acting on a vehicle; a vehicle speed sensor electrically connected to the opposing force processor; an air pressure sensor electrically connected to the opposing force processor, wherein the air pressure sensor is disposed to measure air pressure in a direction of travel of the vehicle; an accelerometer electrically connected to the opposing force processor, wherein the accelerometer is disposed to detect a component of acceleration in the direction of travel of the vehicle; a power assist processor electrically connected to the opposing force processor; and a motor power measurement circuit electrically connected to the power assist processor, an electric motor controller, and an electric motor. The motor power measurement circuit is disposed to output to the power assist processor a measured value of electrical power from the motor controller to the electric motor, wherein the power assist processor is adapted to modify an amount of power sent from the electric motor controller to the electric motor in response to a change in a magnitude of a net opposing force determined by the opposing force processor from signals sent from the air pressure sensor, the accelerometer, the vehicle speed sensor, and the cadence sensor.

The example apparatus may further include any one or more of the following devices electrically connected to the opposing force processor, singly or in any combination or sub-combination: a user input, a differential air pressure sensor, a tilt sensor, a global positioning system receiver, and a rotation sensor.

The power assist processor may optionally be configured to shift a transmission to change a gear ratio in response to a change in the value of the net opposing force.

The opposing force processor and the power assist processor may optionally be implemented as one processor.

The air pressure sensor may optionally be a dynamic air pressure sensor.

The vehicle speed sensor may optionally correspond to a global positioning system receiver.

The power assist processor may optionally be coupled to a shift actuator. The power assist processor may change a gear ratio in a transmission in response to a change in a value of the net opposing force from the opposing force processor.

DESCRIPTION

Figure 1:
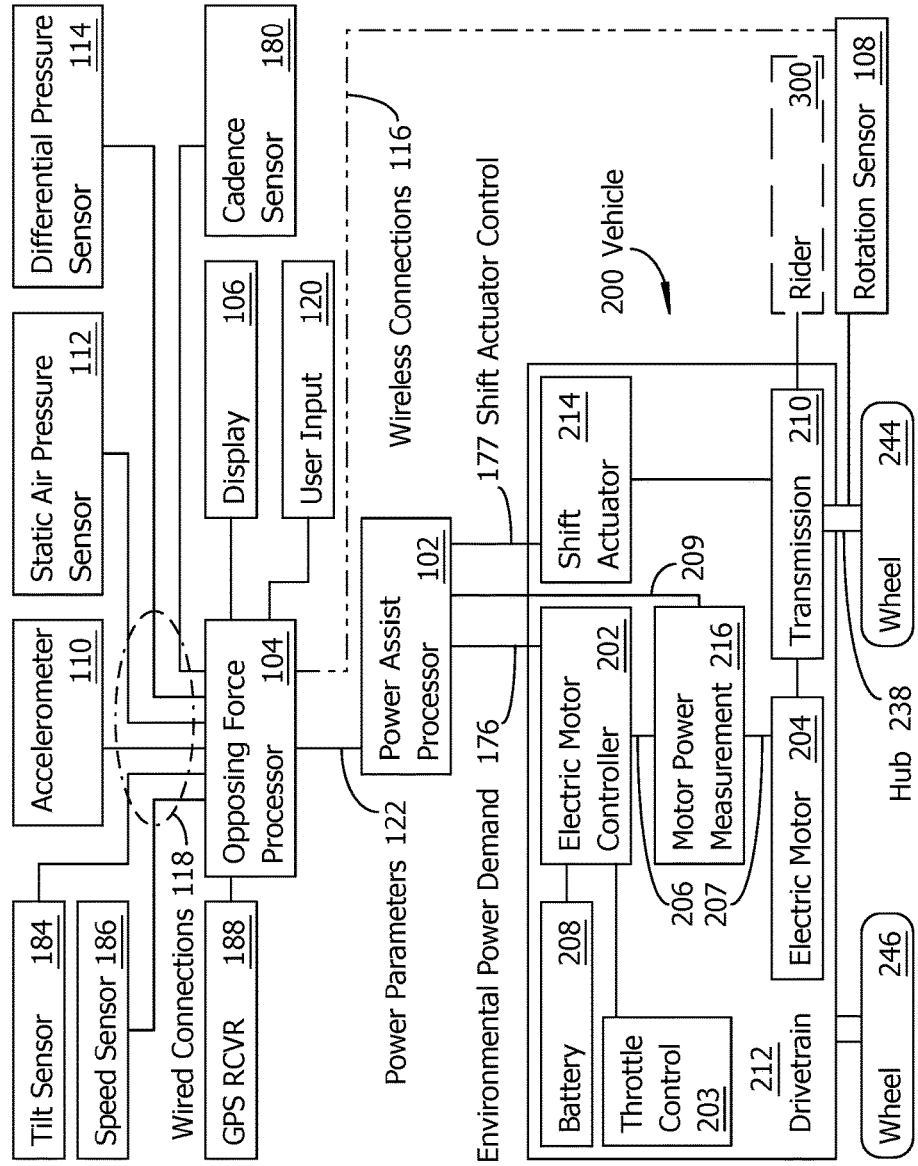
FIG. 1 is a block diagram of an example embodiment of a drivetrain control for a vehicle which may be powered by a combination of an electric motor and human muscle power.

Embodiments include a drivetrain control system for a vehicle which may be powered by an electric motor and/or human muscle power from a person riding the vehicle. A drivetrain control system embodiment measures forces acting on the vehicle while the vehicle is travelling on a road, track, or trail, determines a value for a net force opposing the forward motion of the vehicle, measures an amount of power being provided to the electric motor from its electric power source, and measures an amount of power delivered to the vehicle's drivetrain by the vehicle's rider. The drivetrain control system may then determine a new value of electric power to be supplied to the electric motor to achieve a desired performance objective selected by the rider, for example a desired operating range, travel duration, maximum speed, minimum speed, rider comfort and/or control on rough road surfaces, and so on.

Embodiments operate efficiently and reliably without requiring a direct measurement of torque, thereby eliminating a common cause of system error, high cost, and system failure in previously known control systems for motor-assisted vehicles. Embodiments include a suite of sensors to measure and/or calculate air pressure, [cadence], speed, acceleration, electric power supplied to the electric motor, electric power output from the electric motor, power applied to the vehicle by the vehicle's rider, and optionally other parameters. Environmental parameters such as wind speed, road surface roughness, road surface slope, vehicle speed, resistance from leaves, sand, or other debris on the road surface, and other factors affect values measured by an embodiment and therefore affect power delivered by the electric motor to achieve the rider's objective.

Motor control parameters and/or target values for rider-supplied power may be adjusted dynamically in near real-time in response to changing environmental conditions, road conditions, rider fatigue, and rider preferences. Compared to other systems using torque sensors, embodiments are more easily calibrated and respond specifically with motor power adjustments based on current wind, road slope and roughness, and other conditions. Furthermore, embodiments make it easy for a rider to quickly find the combination of gear ratio and pedaling cadence that meets the selected performance objective.

Some embodiments adjust a setpoint for a control parameter related to operation of an electric motor in response to changes in environmental forces acting on a vehicle. Other embodiments adjust a setpoint for a control parameter related to operation of a transmission coupled to the electric motor and to the drive wheel, propeller, or other driven component on the vehicle. Some embodiments adjust setpoints for both the electric motor and the transmission.

Dynamic adjustments by an embodiment of a control parameter such as power supplied to and/or output from the electric motor may allow a value of a vehicle performance parameter, for example a setpoint value of vehicle speed, to change in response to a detected change in an environmental condition affecting vehicle performance. Examples of environmental conditions which may cause an embodiment to dynamically adjust a control parameter for an electric motor and/or a performance objective for a vehicle include, but are not limited to, a wind velocity relative to the velocity of the vehicle, a change in the slope of the surface over which the vehicle travels, a change in the roughness of the surface, and drag induced by passage through water, sand, leaves, or other material on a surface. Some embodiments measure a selected one of the example environmental conditions and adjust the vehicle drivetrain in response to a change in the one parameter. Other embodiments measure a net force resulting from a selected group of the environmental conditions and adjust the setpoint for operation of the vehicle drivetrain in response to a change in the net force, where the net force is the vector sum of all external forces acting on the vehicle, exclusive of the power provided by the person and the power provided by the electric motor.

Previously known motor controllers may adjust an amount of power delivered to an electric motor in response to a change in a measured amount of power provided by a person to the vehicle or in response to a change in speed by the vehicle, with the objective of keeping a vehicle performance objective such as vehicle speed constant. However, even when the motor controller is unable to maintain performance in accord with the vehicle performance objective, for example because insufficient power is available to sustain a constant vehicle velocity in response to an increase in wind, surface slope, or surface roughness, the motor controller may not adjust the setpoint value related to the performance objective. Furthermore, maintaining constant vehicle speed, constant pedaling cadence, or a constant value for some other parameter may fail to achieve the rider's performance objective or may be unsafe. For example, some previously known control systems may direct a rider to maintain a constant cadence even when the cadence is too low to add power to the drivetrain, for example when the gear ratio is too low for the current speed of the vehicle, as may happen when going downhill. Some riders may not feel stable pedaling at a cadence that is too high or too low. In contrast to previously known motor controllers, embodiments refine motor control by measuring the net opposing force on the vehicle and adjusting power to the motor.

Dynamic adjustment of a setpoint value for operating a drivetrain component to meet a performance objective, and in response to changing environmental conditions, may conserve battery power and may extend an operating range of a vehicle compared to previously known motor control systems. Other advantages of the disclosed embodiments include, but are not limited to, adjusting a setpoint for a drivetrain component to improve operating safety or rider comfort, adjusting a drivetrain component in response to a person's muscle fatigue, adjusting a vehicle performance objective in response to a person's desire to sustain a preferred level of muscular exertion, and adjusting a vehicle performance objective in response to a change in wind velocity, a change in the grade or slope angle of a road surface, and adjusting a setpoint for control of a drivetrain component to permit a person to maintain a preferred cadence while supplying muscle power to the vehicle. An embodiment may optionally change the transmission gear ratio in response to a determination of net opposing force by shifting the transmission to achieve a rider's selected performance objective. For example, an embodiment may automatically shift a transmission to a lower gear ratio when an increase in road slope is detected or when a decrease in power applied to the pedals by the rider is detected.

FIG. 1 illustrates an example embodiment. The example embodiment 100 includes an opposing force processor 104 electrically connected to at least one sensor for detecting an environmental parameter related to an amount of force opposing the motion of a vehicle 200. Unless otherwise indicated, components described herein may be considered to be electrically connected when an electrical signal may pass from one of the components to the other, by a wired connection, by a wireless connection, or by both wired and wireless connections. Wireless connections may be implemented by electromagnetic signals or acoustic signals.

Figure 6:
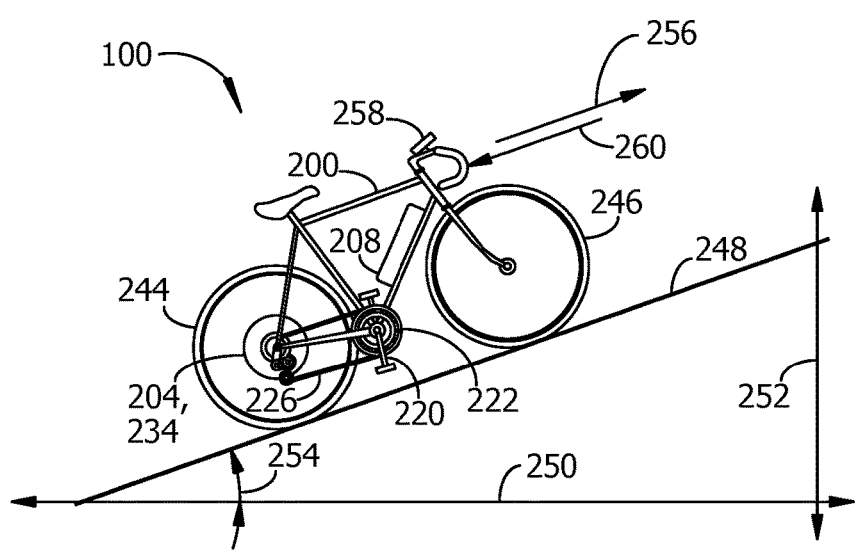
FIG. 6 shows an example of a motor-assisted bicycle embodiment on an inclined road surface.

The opposing force processor 104 may exchange signals relating to sensed environmental parameters over wireless connections 116 and/or wired connections 118 with one or more sensors. Examples of sensors coupled to the opposing force processor 104 include, but are not limited to, a wheel rotation sensor 108, a global positioning system receiver (GPS RCVR) 188, a speed sensor 186, an optional tilt sensor 184, an accelerometer 110, a static air pressure sensor 112, a differential pressure sensor 114, and an optional cadence sensor 180. The static air pressure sensor 112 may be referred to as a barometric pressure sensor 112. The speed sensor 186 preferably measures a magnitude of vehicle speed in the direction of vehicle travel 256 (ref. FIG. 6). A rotation sensor 108 coupled to a wheel 244 or to a wheel hub 238 may optionally be used to determine a magnitude of vehicle speed. The accelerometer 110 preferably measures a value of vehicle acceleration in the direction of travel 256. The air pressure sensor 112 preferably outputs an electrical signal whose magnitude is proportional to the pressure of air striking the sensor as the vehicle 200 moves in the direction of travel 256. Measurements from the differential air pressure sensor 114 may be used to determine the force of wind resistance acting on the vehicle 200, and measurements from the static air pressure sensor 112 may further be used to determine changes in the vehicle's altitude, possibly with better accuracy than obtainable from the GPS 188. The cadence sensor 180 preferably measures a rate of rotation of the cranks (or similar structure) turned by a rider 300 to provide torque to the driven wheel 244 through the transmission 210. A crank 220 may also be referred to herein as a crank arm 220. In some vehicles 200, the crank arms 220 may be turned by the rider's feet and legs. In other vehicles the crank arms 220 may be turned by the rider's arms and hands. Alternative embodiments 100 may include any one or more of these sensors, in any combination.

The wheel rotation sensor 108 may output a pulse signal during the rotation of a shaft or axle on a vehicle. The pulse signal from the wheel rotation sensor 108, when combined with information about a distance traveled per wheel revolution and a time duration of each revolution, may be used to calculate a distance traveled by the vehicle and may further be used to calculate a speed of vehicle motion.

The GPS receiver 188 may output data representing vehicle speed, distance traveled, time, and elevation of the apparatus 100 above sea level. Elevation may be used to estimate air density, a possible contributing factor for a net force acting on a vehicle. The static air pressure sensor 112 may optionally be used to determine elevation, possibly with more accuracy than the GPS.

The speed sensor 186 measures a magnitude of velocity for the vehicle 200 in the direction of travel 256. Examples of a speed sensor include, but are not limited to, the wheel rotation sensor 108, the GPS receiver 188, an optical sensor measuring vehicle speed, an acoustic sensor measuring vehicle speed, a radar sensor, a digital speedometer, an analog speedometer, a knotmeter, for example a knotmeter measuring a rotation rate of an impeller moving through air or water, and the differential pressure sensor 114, for example a differential pressure sensor coupled to a pitot tube. As used herein, speed refers to a scalar value of a rate of change in position with time and velocity refers to a vector representation of speed and a direction of motion. A change in velocity may represent a change in speed, a change in direction, or both.

The optional tilt sensor 184 may output a signal representative of an angle of a reference surface on the sensor relative to the earth's gravitational field. Angles, for example the slope angle 254 of a road surface 248, may be measured relative to a horizontal reference direction 250 and/or a vertical reference direction 252 as suggested in FIG. 6. Embodiments 100 may determine angles 254 from accelerometer data without using a tilt sensor 184, but may use the tilt sensor if one is provided.

The accelerometer 110 may be provided to measure total acceleration in the direction of vehicle movement, including acceleration caused by changes in vehicle speed in the direction of travel, and changes in hill slope in the vehicle's direction of travel. A change in vehicle direction may be made with respect to earth's gravity or may alternatively be made with respect to a specified inertial reference frame, for example the vehicle at rest. The opposing force processor 104 may distinguish between an acceleration change caused by inertial acceleration and gravitational acceleration, for example an acceleration change caused by a change in the slope of a road surface and an acceleration change caused by a change in vehicle speed, by comparing signals from the accelerometer 110 with signals from the wheel rotation sensor 108. The opposing force processor 104 may optionally communicate vehicle pitch angle.

The static air pressure sensor 112 may be connected to the opposing force processor 104 to measure a value of atmospheric pressure in the vicinity of an embodiment 100. Data from the static air pressure sensor 112 may be used to calculate elevation and may be combined with pitch angle data from the accelerometer 110 to provide more accurate readings of altitude and altitude changes than either sensor (110, 112) provides alone. The air pressure sensor 112 may also be used to improve the accuracy of relative wind measurements made by an embodiment.

The differential pressure sensor 114 may be provided to measure a difference in air pressure at two different locations on a vehicle, one location possibly facing a direction of vehicle travel and one location possibly exposed to air pressure corresponding to local atmospheric pressure. The opposing force processor may calculate a value for wind speed relative to the vehicle from the signals from the differential pressure sensor 114. The opposing force processor may further calculate a value of the amount of power needed to move the vehicle through the air from the differential air pressure sensor signals. Wind speed relative to the ground may be calculated from the value for relative wind speed and the vehicle's ground speed as determined from the wheel rotation sensor 108.

The cadence sensor 180 may optionally be provided to measure a repetitive pedaling or cranking motion by a person using an embodiment, for example a number of crank revolutions per minute for a pedaled vehicle or a number of strokes per minute for a rowed, paddled, or sculled watercraft.

A display 106 may be connected to the opposing force processor 104. The display may be, for example, a liquid crystal display, a display including light emitting diodes, or another low-power-consumption display technology suitable for use in portable, battery-powered equipment. Information about vehicle speed, cadence, power produced by the person, power produced by the electric motor, battery capacity, travel time, and other data may be presented on the display 106.

A user input device 120 may be connected to the opposing force processor 104. Examples of a user input device 120 include, but are not limited to, a keypad connected by wired connections to the processor, individually operable switches coupled to the processor by wired connections, [a throttle control], and a smart phone in wireless communication with the opposing force processor 104.

As suggested in FIG. 6, some of the components from the example of FIG. 1 may be placed in an electronics enclosure 258. The example of an electronics enclosure 258 may be mounted at a convenient viewing location on the vehicle 200, for example the handlebars, handlebar stem, top tube of a bicycle frame, or another location.

Figure 2:
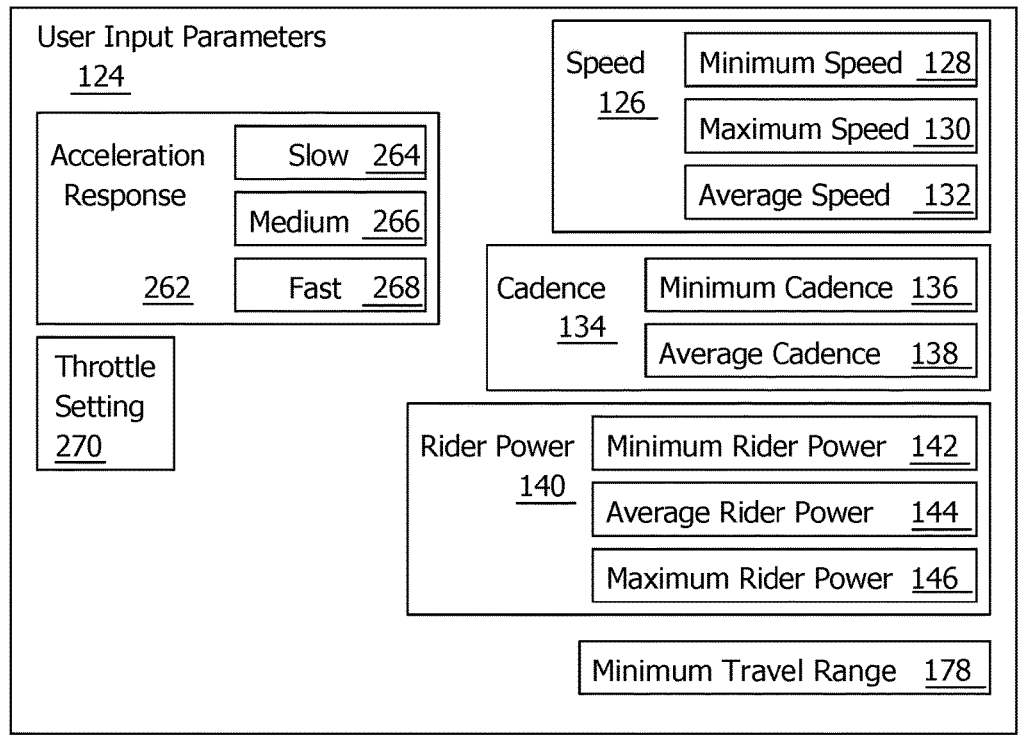
FIG. 2 is a block diagram of example user inputs capable of causing an embodiment to modify a setpoint value of a performance parameter for a drivetrain component.

Some examples of user input parameters 124 are shown in FIG. 2. Examples of user input parameters 124 include, but are not limited to, vehicle speed 126, cadence 134, rider power 140, preferred acceleration response 262 of the vehicle, a throttle setting 270, and minimum travel range 178. A user input parameter 124 for speed 126 may include, for example, a preferred minimum threshold value of speed 128 to be sustained, a maximum vehicle speed 130, an average vehicle speed 132, and a minimum value of speed or cadence related to easy balancing of a bicycle. A value for speed 126 may include a maximum safe operating speed or a maximum speed for comfort on rough or uneven road surfaces. A user input parameter 124 related to cadence 134 may be for a minimum cadence 136 or an average cadence 138.

A user input parameter 124 for acceleration response 262 implements an acceleration profile preferred by a rider, for example, a slow acceleration response 264, a medium acceleration response 266, and a fast acceleration response 268. For example, a slow acceleration response may be suited to some road conditions or rider comfort preferences but may not be suited to all traffic conditions. A fast acceleration response 268 may give a more interesting ride but may deplete battery power more quickly than a slow 264 or medium 266 acceleration response. The throttle setting 270 enables a rider to set an amount of electric power to be supplied to the electric motor.

A user input parameter 124 for cadence 134 may include, for example, a target value for a preferred minimum value of cadence 136 to be sustained while providing muscle power to the vehicle and an average cadence value 138 to be sustained over a selected time duration or distance. Cadence refers to a number of repetitions per unit of time for a periodic motion such as pedaling, sculling, paddling, rowing, and the like.

A user input parameter 124 for rider power 140 may include, for example, a target value for a minimum magnitude of rider power 142 over a selected time duration and/or a selected distance, an average value of rider power 144, and a maximum value for rider power 146. The maximum value of rider power may be selected, for example, to avoid fatiguing a rider too quickly. Rider effort may be represented in an embodiment by a calculation of an amount of power to be supplied by a person for meeting a vehicle performance objective, or by a value calculated from acceleration, time, and measurements related to opposing forces.

A user input parameter 124 may include a preferred minimum value for travel range 178 of the vehicle 200 when operated with a combination of power supplied by a person's muscles and power contribution from an electric motor.

The opposing force processor 104 may form a set of values for power parameters 122. The power parameters 122 may be used to form an estimate of an environmental power demand 176, where environmental power demand is an amount of power needed to balance the net opposing force acting on a vehicle's motion, exclusive of the power provided by a person and the power provided by the electric motor. The net opposing force 260 (ref. FIG. 6) represents the vector sum of all external forces opposing the vehicle's motion in the direction of travel 256. An embodiment may make an accurate determination of the net opposing force without a separate measurement of each force contributing to the net value. In some embodiments, the power parameters 122 may be determined by the opposing force processor 104. In other embodiments, the power parameters 122 may be determined by sensor data sent from the opposing force processor 104 to a power assist processor 102. The power assist processor 102 may send a value for a control parameter representing an environmental power demand 176 to an electric motor controller 202. In some embodiments, the opposing force processor 104 and the power assist processor 102 may be implemented as a single device. The environmental power demand value represents a dynamic setpoint value to be used by the electric motor controller 202 for controlling the electric motor 204.

The motor controller 202 may be coupled to an electric storage battery 208 and to an electric motor 204. A throttle control 203 may be connected to the electric motor controller 202 to enable a rider to set an amount of electric power supplied to the electric motor. The motor controller may output a signal on a line 206 to the motor power measurement circuit 216 and then on a line 207 to the electric motor 204 representing a power demand on the electric motor. The motor power measurement circuit 216 measures an amount of electrical power output from the motor controller 202 to the electric motor 204. The amount of electric power measured by the motor power measurement circuit 216 may be communicated to the power assist processor 102 on a line 209.

The electric motor 204 may be mechanically coupled to a transmission 210. A shift actuator 214 may be operated to select a gear ratio for the transmission 210, possibly in response to a signal from the power assist processor 102 on a shift actuator control line 177. The rider 300, for example a person pedaling the vehicle 200, may supply muscle power to the vehicle 200 through the transmission 210. The drivetrain 212 for the vehicle 200 includes the electric motor 204, the transmission 210, the shift actuator 214, the battery 208, and the electric motor controller 202.

The dynamic setpoint value may be modified by the power assist processor in response to changes in measured environmental conditions contributing to the opposing net force calculation, by changes in power delivered from the rider 300, by capacity remaining in an electric storage battery 208 providing power to the electric motor 204, and by changes in user-entered objectives such as target values for vehicle speed, cadence, rider effort, and/or travel range.

The dynamic setpoint value may be modified by the power assist processor predicting future environmental conditions from trends observed in historical values for net force or individual measured parameters such as wind speed, wind direction, surface slope, and so on. The dynamic setpoint value for environmental power demand may therefore cause the vehicle's drivetrain to be operated faster or slower before a change in an environmental condition is detected.

Figure 3:
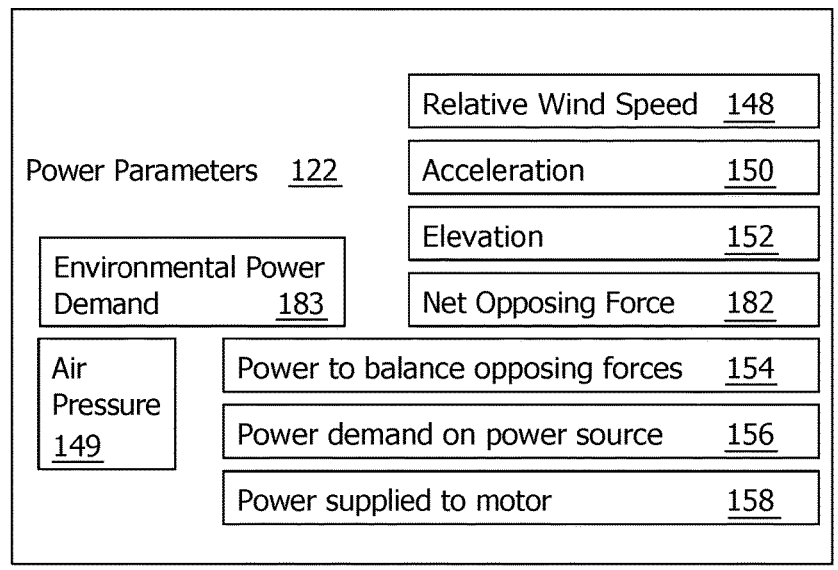
FIG. 3 is a block diagram of example parameters contributing to an estimate of environmental power demand sent to a motor controller.

Examples of power parameters 122 are shown in FIG. 3. Some power parameters 122 are related to sensor data representing phenomena affecting a vehicle's motion and include, for example, total opposing air pressure 149 and acceleration 150. Total opposing air pressure includes air pressure from vehicle motion and air pressure from wind in the nearby environment. Other examples of power parameters 122 include values calculated from sensor data, including for example relative wind speed 148, elevation 152, an amount of power 154 needed to balance a net opposing force 182, corresponding to an environmental power demand 183 affecting motion of the vehicle, and an amount of a power demand 156 on a power source 300 to be combined with output power from the electric motor to meet the vehicle performance objective, possibly by opposing the net force 182 when the net force 182 acts in opposition to the vehicle's speed, or by reducing the power demand on the drivetrain components 212 when the net force 182 acts to increase the vehicle's speed.

Figure 4:
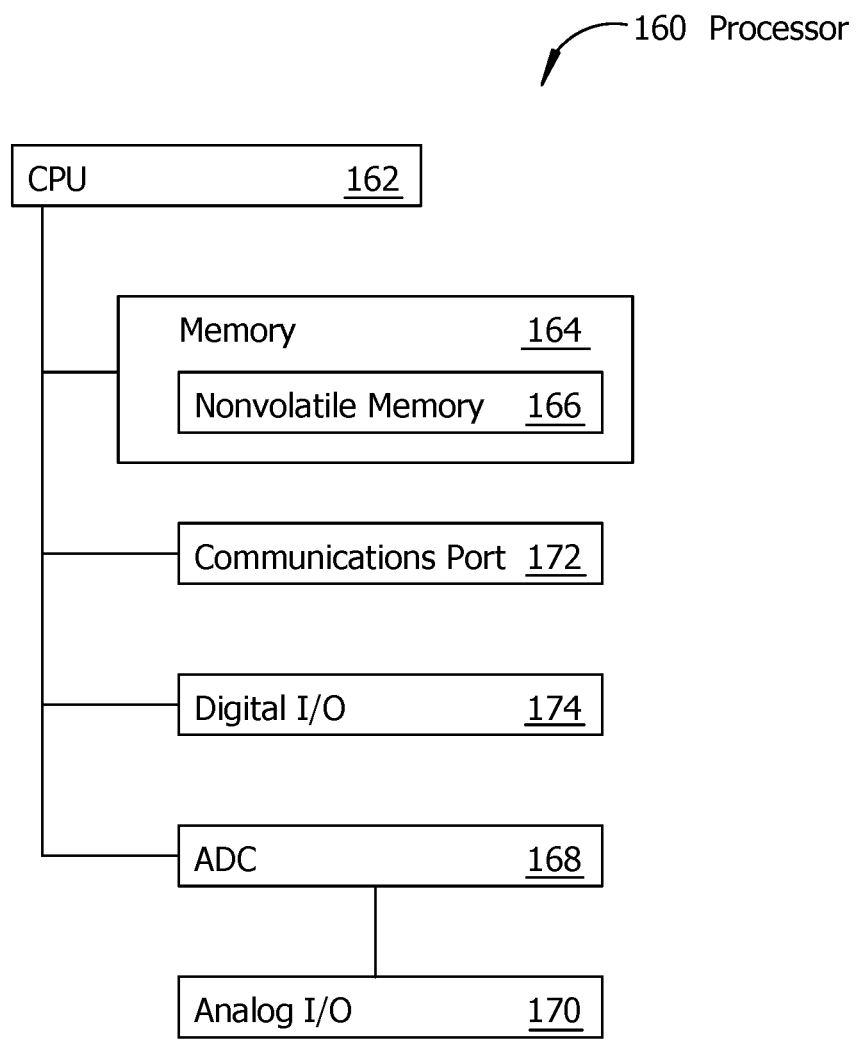
FIG. 4 is an example implementation in hardware of a processor in accord with an embodiment.

An example of a processor 160 suitable for use as an opposing force processor 104 and/or a power assist processor 102 is shown in FIG. 4. The example processor 160, preferably implemented in hardware with a plurality of semiconductor components, includes a central processing unit (CPU) 162 in data communication with a memory 164, a communications port 172, a digital input and/or output (I/O) interface 174, and an analog to digital converter (ADC) 168. The ADC 168 may receive some sensor signals over an analog I/O interface 170 coupled to the ADC 168. The memory 164 may include a nonvolatile memory 166.

Figure 5:
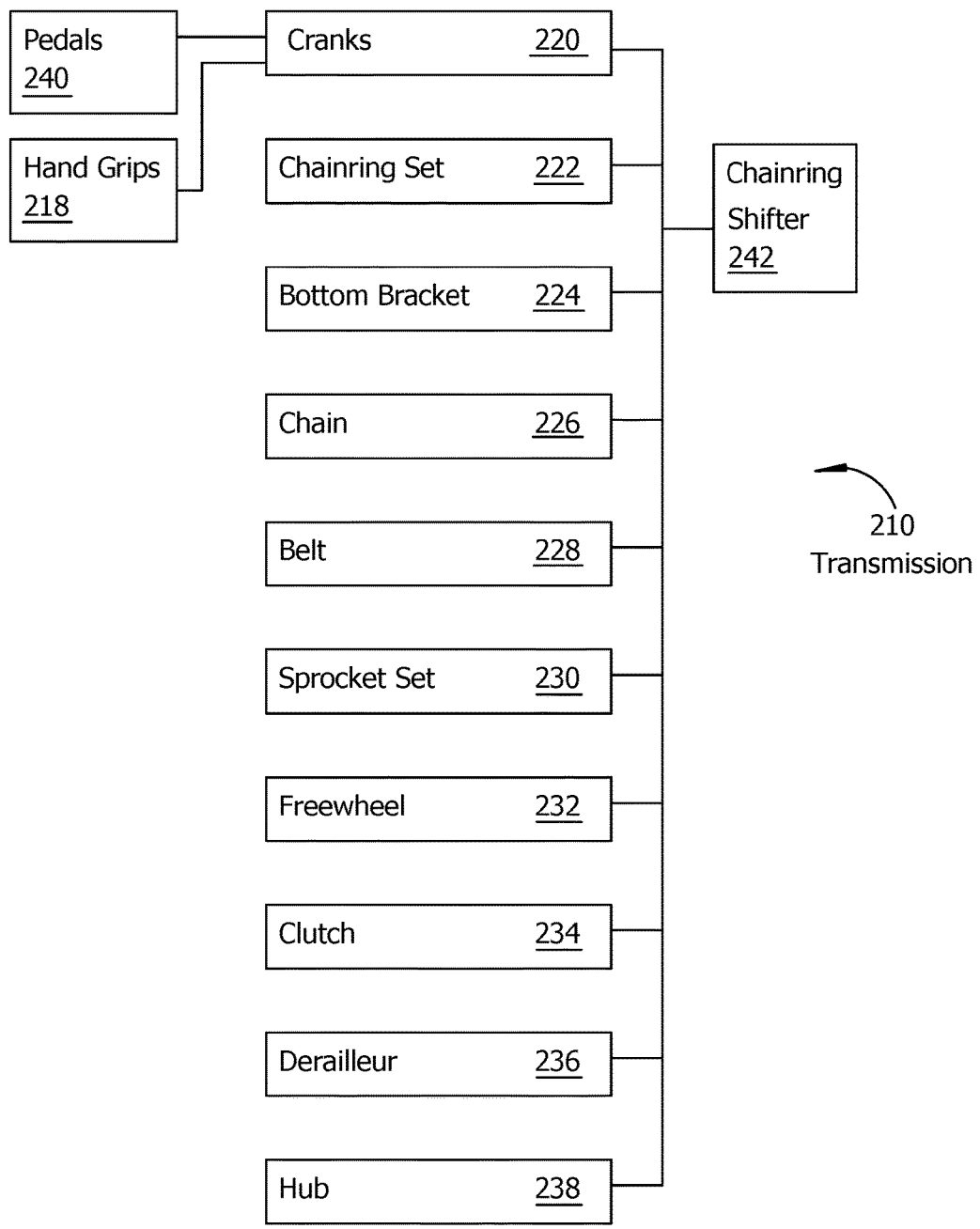
FIG. 5 is an example of components included in a transmission suitable for use with an embodiment, including some optional components.

FIG. 5 shows examples of components included in a transmission 210 suitable for use with an embodiment 100. A set of chainrings 222 coupled to a bottom bracket 224 may be turned by one or more cranks 220. Each of the one or more cranks 220 may be coupled to a pedal 240 or to a hand grip 218. A chain 226 or a belt 228 couples the chainring set 222 to a sprocket set 230 on the driven wheel 244 of the vehicle 200. A freewheel 232 disengages the sprocket set from rotation with the driven wheel when the wheel rotates faster than the sprocket set, preventing the driven wheel from rotating the cranks 220. A clutch 234 couples the electric motor (ref. FIG. 1) to the hub 238 of the driven wheel. A chainring shifter 242 moves the chain from one chainring to another to change the gear ratio. A derailleur 236 moves the chain from one sprocket to another on the driven wheel to change the gear ratio. In some embodiments, either one or both of the chainring shifter 242 and derailleur 236 may be operated by the shift actuator 214 (ref. FIG. 1).

FIG. 6 shows an example of a motor-assisted bicycle 200 controlled by an embodiment 100 to manage power to the driven wheel 244 from rotation of the cranks 220 and from the electric motor 204. The bicycle 200 rests on a road surface 248 tilted from a horizontal reference 250 at a slope angle 254. The forces causing motion of the vehicle 200 in the direction of travel 256 must equal the net opposing force 260 acting on the vehicle 200. Embodiments 100 accurately determine the motor power required to drive the vehicle 200 on a horizontal surface at a preferred performance objective such as speed, range, rider comfort, etc, and automatically adjust electric motor power in response to a detected change in slope 254 of the road surface 248, changes in wind speed, surface roughness, and other environmental factors contributing to the net opposing force 260.

An embodiment may make dynamic adjustments to a setpoint for a control parameter of the motor or transmission as a result of a predicted effect on the vehicle. For example, a sequence of data points representing slope of a road surface may indicate the surface is rising sharply or the rate of rise is changing. Similar predictions may be made for relative wind speed, rolling friction, surface roughness, power being delivered by the person riding the vehicle, and other factors. The power assist processor may recognize such a pattern and make a change in a control parameter such as transmission gear ratio, power supplied to the electric motor, or power to be input by the rider, in advance of the actual effect on vehicle performance being measured. For example, the power assist processor may shift the gears on a motor-assisted bicycle to a lower gear when measurements of road surface slope indicate a good probability of a continuing rise in the road surface, before an actual reduction in rider cadence is detected.

The power assist processor may optionally shift a transmission from one gear ratio to another gear ratio in response to a change in the value of a component of the net opposing force. For example, the power assist processor may shift the transmission in response to a change in the component of the net opposing force resulting from the slope of a road surface. Other examples of a component of the net opposing force that may cause the power assist processor to shift the transmission include, but are not limited to, a value of wind speed, a value of estimated or measured road roughness, and a value or estimate of an amount of debris such as leaves or sand on the road surface.

Unless expressly stated otherwise herein, ordinary terms have their corresponding ordinary meanings within the respective contexts of their presentations, and ordinary terms of art have their corresponding regular meanings.

What is claimed is:

1. An apparatus, comprising:
   an opposing force processor adapted to calculate a value for a net opposing force acting on a vehicle;
   a vehicle speed sensor electrically connected to said opposing force processor;
   an air pressure sensor electrically connected to said opposing force processor, said air pressure sensor disposed to measure air pressure in a direction of travel of the vehicle;
   an accelerometer electrically connected to said opposing force processor, said accelerometer disposed to detect a component of acceleration in said direction of travel of the vehicle;
   a power assist processor electrically connected to said opposing force processor; and
   a motor power measurement circuit electrically connected to said power assist processor, an electric motor controller, and an electric motor, said motor power measurement circuit disposed to output to said power assist processor a measured value of electrical power from said motor controller to said electric motor,
   wherein said power assist processor is adapted to modify an amount of power sent from said electric motor controller to said electric motor in response to a change in a magnitude of a net opposing force determined by said opposing force processor from signals sent from said air pressure sensor, said accelerometer, and said vehicle speed sensor.

2. The apparatus of claim 1, further comprising a user input device electrically connected to said opposing force processor.

3. The apparatus of claim 1, further comprising a differential air pressure sensor electrically connected to said opposing force processor.

4. The apparatus of claim 1, further comprising a tilt sensor electrically connected to said opposing force processor.

5. The apparatus of claim 1, further comprising a global positioning system receiver electrically connected to said opposing force sensor.

6. The apparatus of claim 1, further comprising a rotation sensor electrically connected to said opposing force processor.

7. The apparatus of claim 1, wherein said power assist processor shifts a transmission in response to a change in the value of said net opposing force.

8. The apparatus of claim 1, wherein said opposing force processor and said power assist processor are implemented as one processor.

9. The apparatus of claim 1, wherein said air pressure sensor is a static air pressure sensor.

10. The apparatus of claim 1, wherein said vehicle speed sensor corresponds to a global positioning system receiver.

11. The apparatus of claim 1, wherein said power assist processor is coupled to a shift actuator and said power assist processor changes a gear ratio in a transmission in response to a change in a value of the net opposing force from said opposing force processor.

12. The apparatus of claim 1, wherein said power assist processor shifts a transmission in response to a change in the value of a component of the net opposing force.

13. The apparatus of claim 12, wherein said component of the net opposing force is a slope of a road surface.

14. The apparatus of claim 12, wherein said component of the net opposing force is a value of wind speed.

15. The apparatus of claim 12, wherein said component of the net opposing force is a value of road roughness.

* * * * *